United States Patent [19]

Becker

[11] 4,300,350

[45] Nov. 17, 1981

[54] BISTABLE THERMAL ACTUATOR

[75] Inventor: Dale F. Becker, Duluth, Ga.

[73] Assignee: Sangamo Weston, Inc., Norcross, Ga.

[21] Appl. No.: 133,216

[22] Filed: Mar. 24, 1980

[51] Int. Cl.³ .............................................. F03G 7/06
[52] U.S. Cl. ......................................... 60/528; 60/529
[58] Field of Search ........................... 60/527, 528, 529

[56] References Cited

U.S. PATENT DOCUMENTS

| 952,778 | 3/1910 | Wohl et al. | 60/528 X |
|---|---|---|---|
| 954,682 | 4/1910 | Low et al. | 60/528 |
| 2,539,185 | 1/1951 | Dayton | 60/529 X |
| 2,743,574 | 5/1956 | McCorkle | 60/529 |
| 3,152,554 | 10/1964 | Kofink | 60/529 X |
| 3,229,177 | 1/1966 | Clarke | 60/527 X |
| 3,366,865 | 1/1968 | Shapiro | 60/529 X |

Primary Examiner—Allen M. Ostrager
Attorney, Agent, or Firm—Joseph J. Kaliko; Mikio Ishimaru; Dale Gaudier

[57] ABSTRACT

A thermal actuator or heat motor employing end-to-end bimetal, bistable strip portions spanning a pair of supports but having a total length greater than the straight-line distance across the supports and capable, upon the selective application of heat to either portion to the exclusion of the other to cause the strip portions to snap back and forth across a centerline representing the straight-line distance across the supports, together with selective heat-applying means and a force-transmitting element connected to the midpoint of the strip portions for supplying mechanical, electro-mechanical, etc., power.

10 Claims, 4 Drawing Figures

BISTABLE THERMAL ACTUATOR

BRIEF SUMMARY OF THE INVENTION

It is known in the art of course to utilize bimetal strips for creating forces as a result of the ability of the strips to snap back and forth between two positions as the strips, because of different coefficients of expansion, change position. The prior art is devoted, however, mainly to side-by-side strips, details of end loading of the strips to accommodate buckling action, etc. No known art provides a simple and economical solution employing end-to-end strips or strip portions for accomplishing these results while at the same time exploiting temperature-compensated principles.

According to the present invention, a simple, quick-acting actuator is provided, being compact in design and flexible in operation and constructed in such manner as to utilize readily available materials. In its simplest form, the actuator may comprise a ring-like frame in which diametrically opposite parts provide supports for an elongated composite bimetallic element that spans the rings but which has a total length greater than the diameter of the frame, the element thus forming two arcuate portions or halves having the bimetals oppositely arranged so that when one half is subjected to the application of heat energy to the exclusion of the other, the element snaps over center across the diameter and remains there until heat energy is applied to the other portion or half to cause the element to return to its first position. A force-transmitting member may be connected to the element at its central portion to partake of movement of the element as it snaps back and forth to its opposite positions. In a second form of the invention, the element is made up of a composite strip twisted 180° at its central portion so that the halves are reversed vis-a-vis each other and lie flatwise to the direction of movement and the central portion lies in the plane of movement. In either form, the frame may have a radial or like wall formed with diametrically spaced openings through which heat may be applied to either half exclusively of the other, the imperforate portion of the wall serving as a heat shield.

DETAILED DESCRIPTION OF THE INVENTION

In the interests of brevity and clarity, but not by way of limitation, the forms of the invention have been shown in simplistic style intended to convey the basic principles of construction and function.

Figure 1:
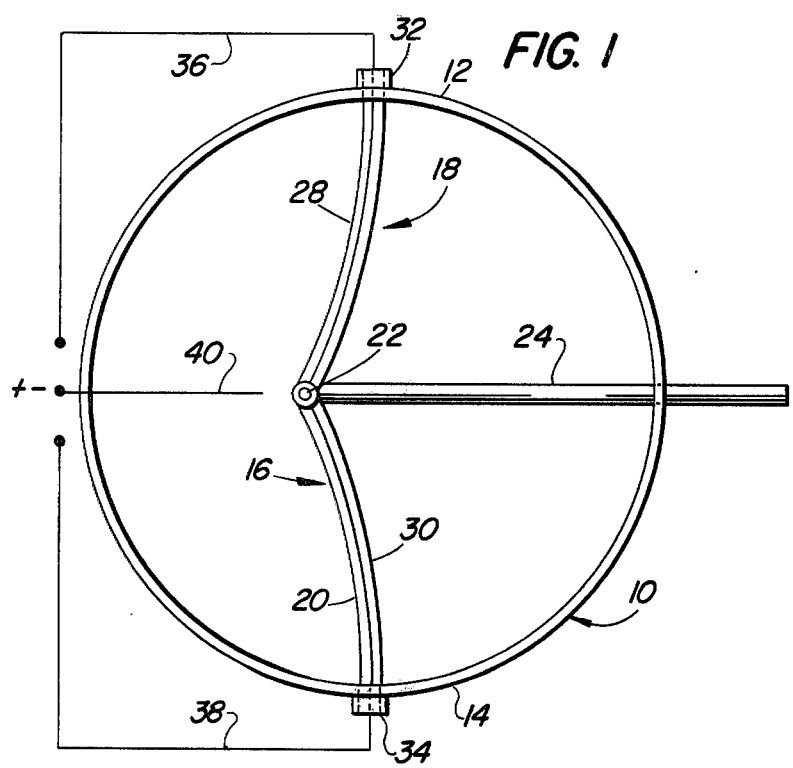
FIG. 1 is an elevation of one form of the invention, showing the element in one of its two positions.
Figure 2:
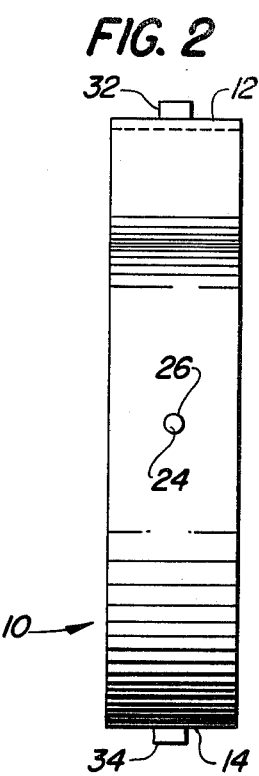
FIG. 2 is an end view of the same.

Reference is had first to FIGS. 1 and 2, where the numeral 10 designates an annular or ring-like frame of which diametrically opposed portions provide a pair of spaced apart supports 12 and 14. Spanning or bridging across the frame between these supports is an elongated element in the form of a bimetal strip 16 providing first and second (here upper and lower) portions or halves 18 and 20 respectively. The total length of the strip is greater than the straight-line or diametrical distance between the supports so that the strip occupies, in the one position illustrated, a status such that the upper and lower halves curve toward one side of the frame, with the inner or joined ends lying on a point on a line that is a diameter normal to the diameter on which the supports 12 and 14 lie. At this point, the central portion of the strip is connected, as by a suitable pin or pivot 22, to a force-transmitting member such as a push-pull rod 24. The terminal end of this rod extends through an aperture 26 in the frame and is thus guided thereby for linear movement as the element 16 moves back and forth between the position shown and a second position (not shown) that is the reverse of the first position.

To provide for the bimetal characteristics of the element so that it partakes of changes in position, the upper half has a different metal 28 at one side thereof and the lower half has the same kind of metal 30 at its opposite side. In this example of the invention, the type of heat energy used to effect actuation of the device is electrical, but it may be of any form. By way of illustration, the outer end of the upper half is connected at 32 to the support 12 and the outer end of the lower half 20 is connected to the support 14 at 34. The ring or frame may be of any suitable material and, obviously, if it is of metal, the connections at 32 and 34 will include appropriate insultation. An electrical lead 36 is connected to the upper end of the strip 16 at the connection 32 and a like lead 38 is connected to the lower end of the strip at the lower connection 34. A common lead 40 is connected to the strip at its central portion.

In operation, if the leads 36 and 40 are interconnected, heat and energy is supplied to the upper half 18 of the strip 16 and the difference between the coefficients of expansion between the strip and its bimetal 28 will cause the upper half to snap over center (considered here as lying on the diameter that extends between the connections 32 and 34), carrying the lower and unaffected (by heat) lower half 20 with it so that the pin 22 occupies a second position that is a mirror image of the position illustrated. This of course carries the rod 24 with it, causing the rod to transmit force to any suitable device (not shown) such as a valve, switch, etc. Once the strip snaps over to its new position, it remains there and further application of heat to the upper half 18 has no effect. When the leads 36 and 40 disconnected and, instead, the leads 38 and 40 connected, heat energy is applied to the lower half 20 and the strip snaps back to its original position, of course carrying the rod 24 with it. It is thus seen that heat energy is applied to either half, selectively, to the exclusion of the other. The device thus has two bistable positions, is temperature compensated and unaffected by ambients. To clarify the operation: When the strip 16 moves from left to right, as seen in FIG. 1, and reaches a central position, which is halfway between its first and second position, the total strip assumes somewhat the form of an elongated letter "S" in reverse and likewise when the strip reverses.

Figure 3:
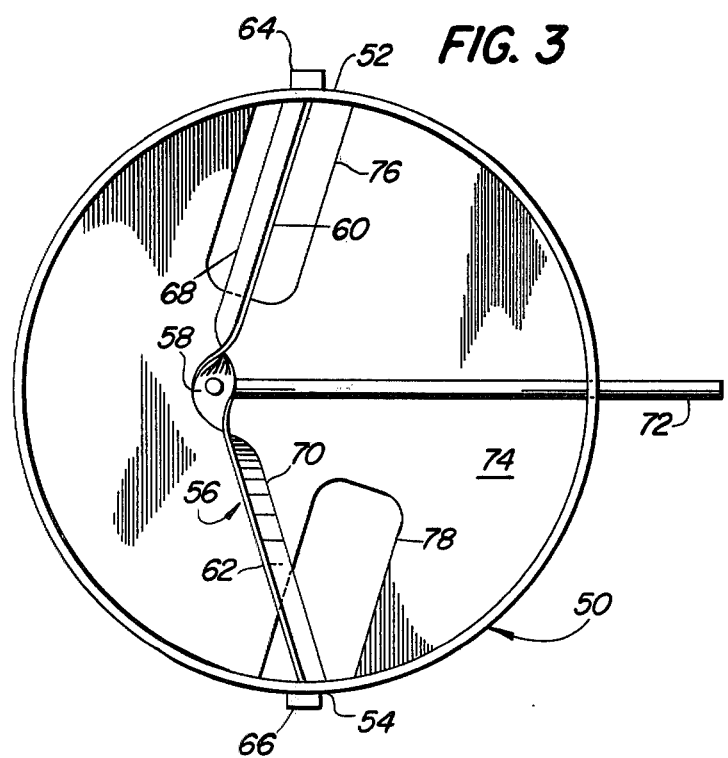
FIG. 3 is an elevation of a second form of the invention.
Figure 4:
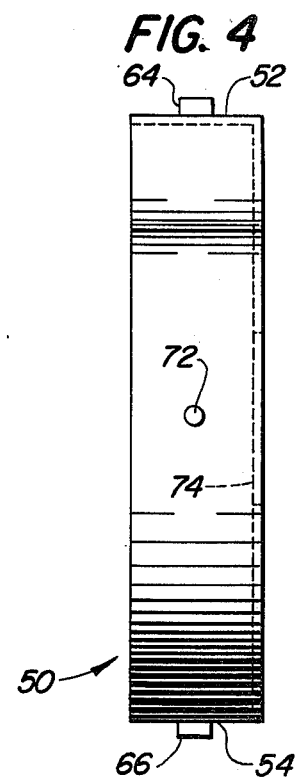
FIG. 4 is an end view of the same.

That form of the invention shown in FIGS. 3 and 4 has of course the same characteristics as above described; although, the construction is different. The basic frame may again be an annulus or ring 50 in which diametrically opposed parts (here upper and lower) provide supports 52 and 54 for an elongated element or bimetal strip 56. The strip here is a one-piece element twisted 180° at a central portion 58 to provided upper and lower portions or halves 60 and 62 respectively, the outer ends of which are suitably connected to or supported by the upper and lower supports 52 and 54 respectively at 64 and 66. These halves lie crosswise to the direction of movement of the strip, or are oriented the same as the halves 18 and 20, whereas the central portion 58 lies generally in the plane of movement of the strip; i.e., along a line that is a diameter normal to the diameter that extends between the connections 64 and 66. The twist has the advantage that it places the same metal at opposite sides of the strip, as at 68 and 70 respectively for the upper and lower halves 60 and 62. A push-pull rod or force-transmitting member 72 is connected to the central portion 58 and functions like that described above, which will be clear without further elaboration.

Another characteristic brought out in this form of the invention is that the frame or ring is, or may be if circular, in the form of a cup having a radial wall 74 provided with the upper and lower openings 76 and 78, arranged as shown. As seen in FIG. 3, the upper half of the strip is disposed toward the left, and the corresponding opening 76 is likewise arranged. The lower opening inclines to the right, which will correspond to the position of the lower half 62 when the strip snaps to its second position. These openings are provided as entries for the application of heat energy when energy other than direct electrical is employed. Because of the arrangement of the openings, heat energy may be applied to either strip half to the exclusion of the other, the imperforate portion of the wall serving as a heat shield.

I claim:

1. A bistable thermal actuator, comprising: a pair of spaced apart supports, an elongated composite bimetal element extending across and between the supports and having opposite ends adjacent and connected respectively to the supports, said element having a total length in excess of the distance between the supports so that the element buckles substantially symmetrically in one direction at its central portion substantially midway between the supports to form a pair of end-to-end arcuate halves, said element occupying a first position with its central portion over center at one side of a straight line between its opposite ends and movable over center as respects that line to a second position, whereby, when heat is applied exclusively to one half, the element moves from its first position to its second position and, when heat is applied exclusively to the other half, the element moves back to its first position.

2. The actuator of claim 1, including a force-transmitting member movable in response to movement of the element.

3. The actuator of claim 2, including means on at least one of the supports for carrying the member for movement.

4. The actuator of claim 1, in which the supports are part of a frame carrying the element.

5. The actuator of claim 4, in which the frame is circular and the opposite ends of the element lie on a common diameter.

6. The actuator of claim 1, in which the element is striplike and is twisted 180° at its central portion so that the halves lie transverse to the line of movement and the central portion lies substantially in the plane of movement.

7. The actuator of claim 1, in which at least one of the supports carries wall means having a pair of openings for admitting heat respectively to the halves, the wall further including an imperforate portion affording a heat shield limiting the application of heat exclusively to the respective halves.

8. The actuator of claim 7, in which the supports are diametrically opposed parts of a ring-like frame and the wall means is a radial wall of the frame.

9. The actuator of claim 1, in which the heat is supplied electrically.

10. The actuator of claim 9, in which the supports are metallic and are insulated from opposite ends of the element.

* * * * *

UNITED STATES PATENT AND TRADEMARK OFFICE
CERTIFICATE OF CORRECTION

PATENT NO. : 4,300,350
DATED : November 17, 1981
INVENTOR(S) : Dale F. Becker

It is certified that error appears in the above-identified patent and that said Letters Patent are hereby corrected as shown below:

Column 2, line 25, "insultation" should read — insulation —.

Column 2, line 44 insert — are — between "40" and "disconnected".

Column 2, line 45 insert — are — between "40" and "connected".

Column 2, line 65, "provided" should read — "provide" —.

Signed and Sealed this

Twenty-second Day of June 1982

[SEAL]

Attest:

*Attesting Officer*

GERALD J. MOSSINGHOFF

*Commissioner of Patents and Trademarks*